July 17, 1951 M. JOFFE 2,561,203
CORN POPPING DEVICE
Filed June 4, 1949
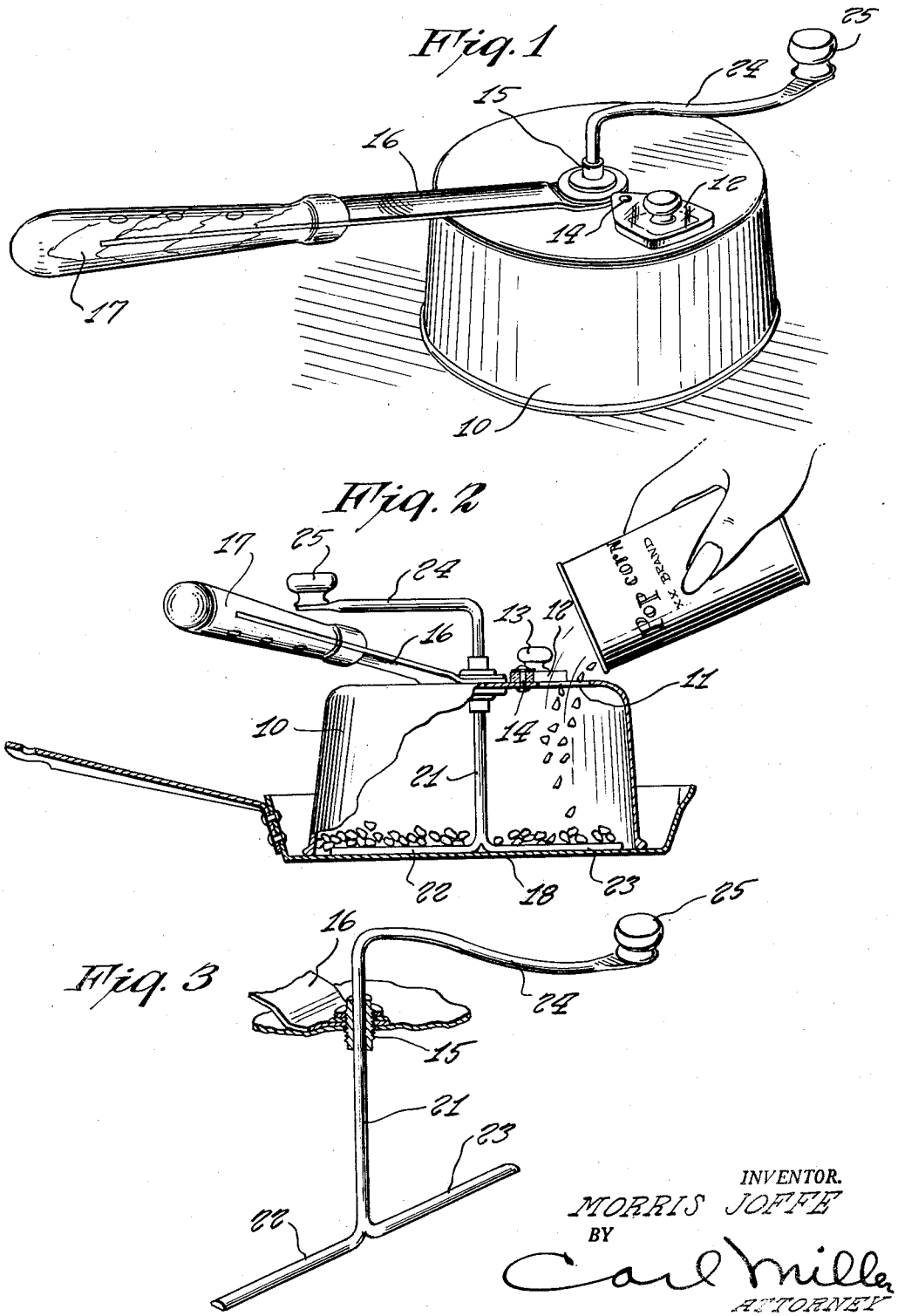
INVENTOR.
MORRIS JOFFE
BY
Carl Miller
ATTORNEY Patented July 17, 1951

2,561,203

UNITED STATES PATENT OFFICE 2,561,203

CORN POPPING DEVICE

Morris Joffe, Brooklyn, N. Y.

Application June 4, 1949, Serial No. 97,168

3 Claims. (Cl. 259—122)

This invention relates to a corn popping device adapted to be fitted over a flat heating surface.

It is an object of the present invention to provide a corn popping device adapted to be placed in a skillet or spider on which the particles of corn are dropped and to contain the popped corn and at the same time provide agitating means for keeping the popped corn free of the surface of the skillet and a lifting handle for the device whereby the device can be lifted while hot free of the skillet or spider.

Further objects of the present invention are to provide a transparent cover on top of the casing so as to permit the operator to detect when the corn has been popped sufficiently to remove it from heat, and also permit the operator to slide open the cover, and permit additional popcorn to be added from time to time as may be desired.

Other objects of the present invention are to provide a corn popping device which is of simple construction, inexpensive to manufacture, easy to operate, compact, has a minimum number of parts and efficient in operation.

For other objects and for a better understanding of the invention, reference may be had to the following detailed description taken in connection with the accompanying drawing, in which Fig. 1 is a perspective view of the corn popping device open on the bottom and adapted to be placed in a skillet.

Fig. 2 is a fragmentary elevational view of the corn popping device disposed in the skillet with portions broken away to show the interior thereof.

Fig. 3 is a perspective view of the agitating device and with portions broken away from the casing to show the sleeve bearing for the agitating device.

Referring now to the figures, 10 represents the main casing which is open at the bottom and closed at the top. This casing has an opening 11 in the top thereof closed by a transparent cover 12 with a handle 13 thereon. This cover is pivoted upon a rivet 14 and can be slid from the opening 11. The cover being transparent permits the operator to detect when the corn has been popped sufficiently to remove it from the heat. In the top of the casing is an opening in which is extended a threaded bushing 15. This bushing also extends downwardly through an arm for the securement of the same rigidly to the top of the casing and which has an insulating handle portion 17 thereon. By means of this handle, the casing can be lifted from a skillet or spider 18 or lowered thereonto.

Depending downwardly through the bushing 15 is an agitating rod 21 split and having laterally extending separated half portions of the rod, as indicated at 22 and 23, adapted to rest flat upon the heated skillet surface to elevate the corn therefrom and to keep it from sticking thereupon. The upper end of the rod 21 is bent laterally, as indicated at 24, to provide an operating arm. On this arm is a knob 25. The arm is rotated while the corn is being popped.

While various changes may be made in the detail construction, it shall be understood that such changes shall be within the spirit and scope of the present invention as defined by the appended claims.

Having thus set forth and disclosed the nature of my invention, what is claimed is:

1. A corn popping device comprising a casing having a high side wall, an elevated closed top and an open bottom ring on the side wall adapted to rest upon a heated surface, said casing having an opening in the top through which corn kernels can be poured to engage with the heated surface, a cover on the top adjustable over said opening, a bushing extending through the closed top of the casing and an agitating rod extending through the bushing and rotatable therein, said rod having horizontally extending portions engageable with the heated surface and an arm for operating the same externally of the casing.

2. A corn popping device comprising a casing having a high side wall, an elevated closed top and an open bottom rim on the side wall, the open bottom rim adapted to rest upon a heated surface, a bushing extending through the closed top portion of the casing, an agitating rod device rotatable in said bushing and having split separated portions extending horizontally for engagement with the heated surface to agitate the corn, said rod having a handle portion extending laterally therefrom by which the agitating means can be operated.

3. A corn popping device comprising a casing having a high side wall, an open bottom rim on the side wall and a closed top portion, a handle engageable with the top portion at substantially the center thereof, a securing bushing extending downwardly through the handle and the top portion of the casing, an agitating rod device pivotable in the bushing and having a laterally extending portion adapted to engage with a heated surface to agitate the corn while the casing retains the popped corn, said rod having an arm extending laterally from the upper end of the same and externally of the casing by which the rod may be operated.

MORRIS JOFFE.

REFERENCES CITED

The following references are of record in the file of this patent:

UNITED STATES PATENTS

| Number | Name | Date |
|---|---|---|
| 1,032,212 | Hilton | July 9, 1912 |
| 1,178,520 | Johnston | Apr. 11, 1916 |
| 1,344,836 | Walden | July 29, 1920 |
| 2,194,852 | Gundelfinger | Aug. 1, 1938 |